(No Model.)
J. U. SEGESSER.
BRETZEL CUTTER.
No. 283,522.　　　　　Patented Aug. 21, 1883.
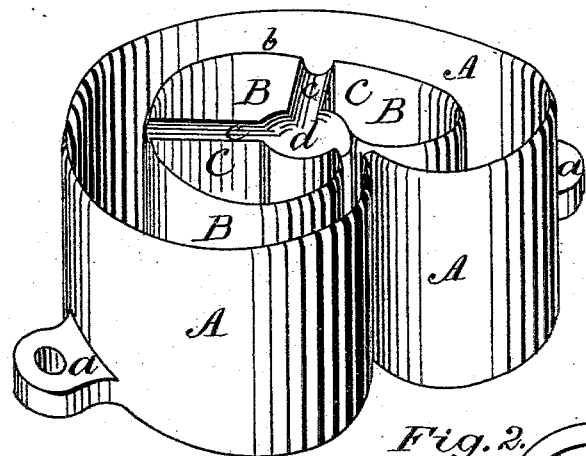
Fig. 1.
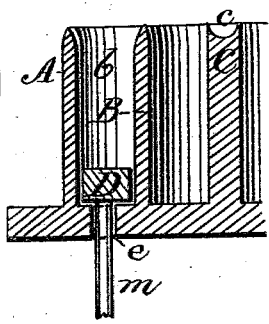
Fig. 4.
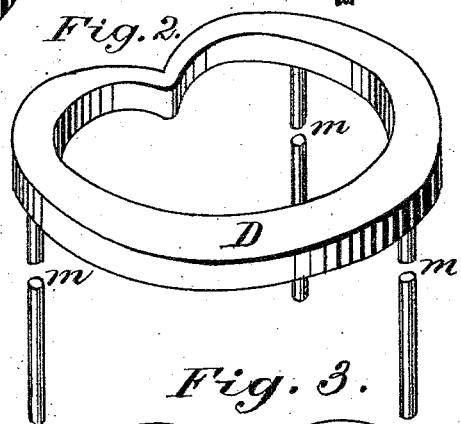
Fig. 2.
Fig. 3.
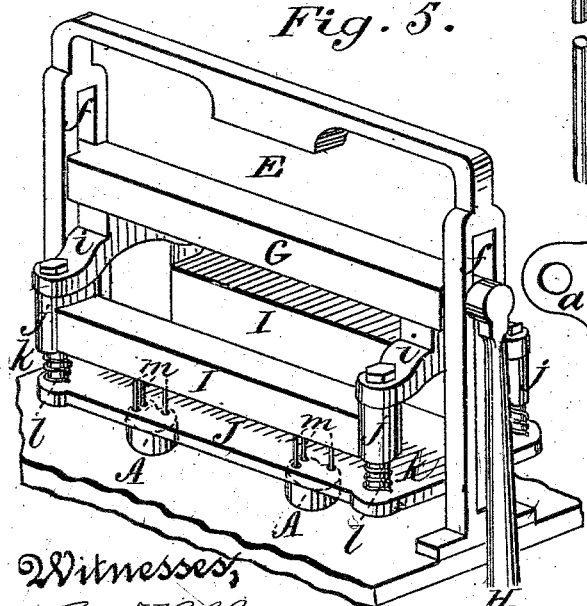
Fig. 5.
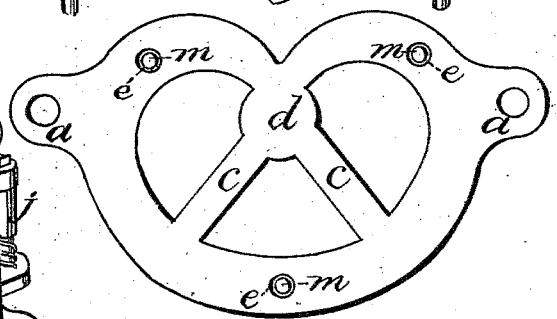
Witnesses,
Geo. H. Strong
J. H. House
Inventor
John U. Segesser
by Dewey & Co
Attorneys

UNITED STATES PATENT OFFICE.

JOHN U. SEGESSER, OF SAN FRANCISCO, CALIFORNIA.

BRETZEL-CUTTER.

SPECIFICATION forming part of Letters Patent No. 283,522, dated August 21, 1883.

Application filed June 23, 1882. (No model.)

*To all whom it may concern:*

Be it known that I, JOHN U. SEGESSER, of the city and county of San Francisco, State of California, have invented an Improved Bretzel-Cutter, and I hereby declare the following to be a full, clear, and exact description thereof.

My invention relates to a new and useful bretzel-cutter; and it consists in a shield-like die or stamp provided with a double-spaced wall around its edge, in which an ejector is adapted to move, and with a hollow center crossed by radial walls, in the bottoms of which grooves are made, all of which will hereinafter be more fully described.

At present bretzels are made both by hand and by machinery. The machines for accomplishing this work are constructed, as far as I am aware, of two revolving impinging rollers, in the faces of each of which one half the pattern or stamp is made. It is found by experience that by this means only the stiffest kind of dough can be used in order to prevent it from sticking to the shallow grooves of the pattern or stamp, and thus occasioning loss. This entails the use of proving-boxes, in which the stiff dough, after being cut into bretzels, is placed to make it rise properly.

The object of my invention is to provide a means for cutting the bretzels out of better and lighter dough, which has not afterward to rise, thus doing away with the proving-boxes and saving much time and labor.

Referring to the accompanying drawings, Figure 1 is a perspective view, showing bottom of the cutter. Fig. 2 is a perspective view of the ejector; Fig. 3, a plan showing top of cutter; Fig. 4, a section of cutter inverted. Fig. 5 is a perspective view of a machine, showing application of the cutters.

Let A represent a shield-like casting provided with ears $a\ a$, whereby it may be bolted to the plate hereinafter described. Within this is cast a second wall, B, at a little distance from the first, A, thus leaving a deep space, $b$, between the two walls. The top of this space is closed and the bottom is open, as shown. In the hollow center of this spaced wall are walls C C, converging from the inner wall, B, and meeting at the inwardly-extending line or edge of the inner wall. In the bottoms of these walls are made grooves $c\ c$, joining to form a circular groove, $d$, which is connected with the space $d$, as well as with the grooves $c\ c$. Through the closed top of the space $b$ are made holes $e$.

D is the ejector. This consists of a piece of metal the shape of and occupying the space $b$, loosely enough to move easily up and down therein. To this are secured rods $m$, passing up through holes $e$ in the top of the space $b$.

In order to fully explain the use and advantage of this cutter, I shall show a portion of the machinery with which it is connected.

E is a frame, in the sides of which are vertical slots $f$. In these slots a cross-bar, G, is made to reciprocate vertically by means of a pitman, H, the lower end of which may be supposed to be connected with a crank. I is another bar, connected with the upper one by arms $i$, and provided with sockets $j$ at its ends. J is a plate under bar I, and having pins $k$ extending up through sockets $j$, and secured by nuts above.

Springs $l$ are placed around pins $k$, between the plate J and the ends of sockets $j$. To the plate J, underneath, the cutter, or any suitable number of them, are bolted by the ears $a\ a$. The rods $m$ pass up loosely through the plate J, and are secured to the bar I.

The operation of this device is as follows: By the downward movement of the bar G both bar I and plate J descend. The latter brings its cutter in contact with the dough, which travels upon an endless belt in the usual manner. By reason of the sockets $j$ and the springs $k$ the bar I continues to descend. This movement forces down the ejector D in the center, and throws the bretzel out just at the moment when the parts begin again to ascend. This is the ordinary construction, substantially, of machines now in use, and I claim nothing new for it, my object being only to show the operation of my particular device—namely, the cutter.

The space $b$ forms the outside ring of the bretzel, and the grooved walls C C form the cross-bars, which are rounded and pressed into shape by this construction.

This device cuts the dough sharply, and it cannot stick to it, no matter what quality I use. I may therefore use risen dough and dispense, as I have before explained, with proving-boxes.

It will be evident that, while the outside or rim of the bretzel is cut out sharply by the cutting-edges of the walls A B, the interior cross-bars are stamped and firmly pressed by the bottom of the shallow grooves $c\ c\ d$, thus rendering the bretzel stronger and better in construction for handling than any at present in the market and cut out by any other machine. The cross-bars are so tightly pressed that the dough forming them is squeezed into a very small space; hence it is more dense, and consequently stronger. The air caught in the grooves $c\ c\ d$ in their descent escapes over the ends into space $b$, whence it is forced upward as the dough is reached, and passes out the holes $e\ e$. This avoids the frequent spoiling of the bretzels in the course of their formation, caused by the interference of the air caught in the descent of the cutter. My ejector D acts only upon the outside or rim of the bretzel, and by its contact therewith tends to flatten its face and smooth the irregularities therein. In my device there are no air-escape openings coming in direct contact with the dough, and into which little tongues thereof are liable to be pressed, thus causing the bretzel to adhere to the cutter when it is raised. On the contrary, a plain and even surface is presented and forced downward at the proper moment to expel the bretzel from the cutter, and this surface comes in contact with the bretzel on that part that is most liable to be uneven because of its being cut out by a deep die. It is evident that I can groove the face of the ejector, if desired, so as to press the bretzel into a rounded form. The ejector consequently serves not only to force the bretzel from the cutter at the proper time and by pressure only on the necessary part, but also, in the course of its operation, to press said part into shape.

I am aware that it is not new to provide a bretzel, cake, or cracker cutter with an ejector adapted to throw it from the die after it has been cut, and also that many other features of this invention are not broadly novel, hence I make no broad claim thereto; but,

Having thus described my invention, what I claim as new, and desire to secure by Letters Patent, is—

In a bretzel-cutter, the walls A B and the cross-wall, C, provided with the shallow-bottom grooves, $c\ c\ d$, as shown, in combination with the ejecting band or ring D, having the pins $m\ m$ attached thereto, said band being located between the walls A and B, as and for the purpose specified.

In witness whereof I hereunto set my hand.

JOHN U. SEGESSER.

Witnesses:
C. D. COLE,
J. H. BLOOD.